United States Patent Office 3,235,438
Patented Feb. 15, 1966

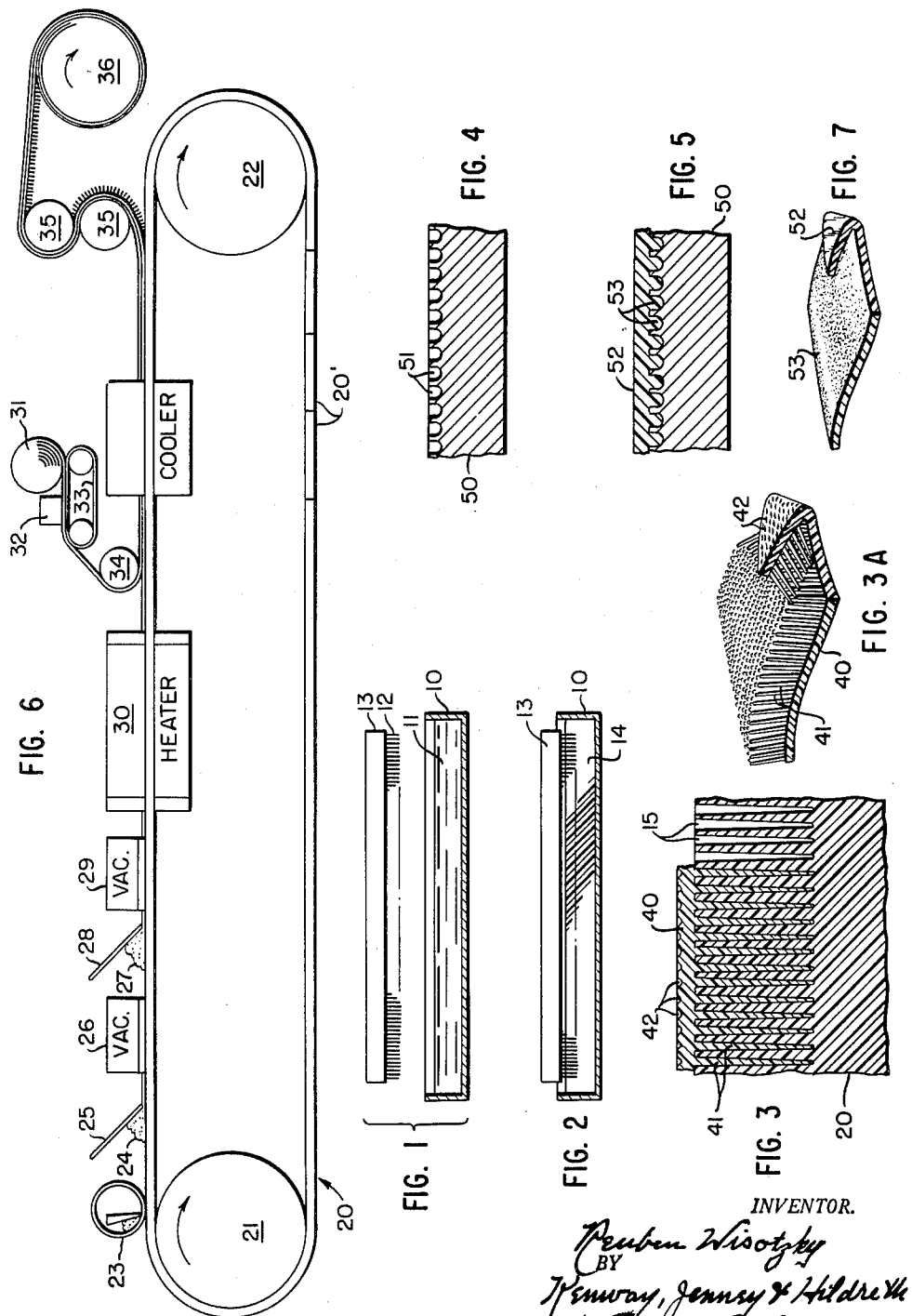

3,235,438
MOLDED ELASTOMERIC PRODUCT HAVING INTEGRAL FLEXIBLE HAIR-LIKE FILAMENTS
Reuben Wisotzky, Lexington, Mass., assignor to American Biltrite Rubber Co., Inc., Chelsea, Mass., a corporation of Delaware
Original application May 20, 1960, Ser. No. 30,539, now Patent No. 3,098,262, dated July 23, 1963. Divided and this application Dec. 1, 1961, Ser. No. 156,285
1 Claim. (Cl. 161—62)

This application is a division of my copending application Serial No. 30,539, filed May 20, 1960 (now Patent No. 3,098,262, July 23, 1963), in which is claimed the herein disclosed continuous process of manufacturing elastomeric resinous hirsute products and apparatus therefor.

This invention comprises a new and improved elastomeric sheet product having suede, hirsute or other distinctive surface patterns. The term "elastomer" is used herein to include any suitable vulcanizate or polymerizable synthetic resin which may be transformed from liquid or viscous to solid state by vulcanizing, polymerizing or fusing.

A large number of useful and decorative products are presently being manufactured from elastomeric materials and these in many instances are replacing natural materials such as cotton, silk, wood, etc., as used in textiles, footwear, floor and wall coverings and upholstery items. Practically all of these items are pressure-molded. A few are cast from elastomeric resin gels but these are usually in the form of flat sheets or small objects such as figurines. The continuous casting of sheets of highly decorative and intricately embossed or contoured material up to the present time has not been possible.

While many of these elastomeric products are satisfactory as to color, dimensions, and other characteristics which determine the usefulness and appeal of the product, there are certain areas in which elastomeric materials have been heretofore unsatisfactory. For example, it has been impossible to impart to elastomeric materials the general characteristics of suede, plush or carpeting, or other soft surface textures.

In the case of suede, the surface consists of very minute short but sharply tapering projections, while many of the textile plies such as twistweave carpeting have longer projecting tufts or yarns of small diameter. A velvet surface texture is made up of the smallest diameter pile which it is possible to produce. Elastomeric materials, while having all the physical and chemical properties necessary to develop attractiveness and long service life are most economically formed by molding or casting rather than by being incorportaed in a structure of filaments. Heretofore it has been impossible to mold or cast in long continuous lengths elastomeric products having suede, cut pile or hirsute surface texture. The present invention comprises a solution of that problem.

The present invention is based on the discovery of a continuous process whereby textured and decorative sheet products having surfaces varying in appearance from that of fine suede leather to that of pile carpet or even fur can be formed by molding or casting. Intermediate products having a variety or combination of surface characteristics including cut pile, corduroy, metalized or metal insert, or with laminates of varying degrees of transparency or translucency and of coloring may also be produced in continuous lengths by the process of this invention.

The process of my invention is characterized by forming in a series of cooperative steps a suitable endless mold which faithfully reproduces in reverse the desired surface contours, and then casting and molding the product with the desired surface contour and preferably with applied decorative color variations.

The continued production of such a product necessitates the employment of a continuous band which acts both as a carrier and casting mold in that it must receive the elastomer in a liquid or viscous state and impart to it the exact configuration and decorative surface pattern required, and then advance the material until it has been transformed to a solid state by vulcanization, polymerization or fusion.

The invention includes within its scope the novel procedure herein disclosed of producing a continuous molding and curing band of the character above outlined, and also novel elastomeric products having suede, hirsute, or a combination of these characteristics and appearances.

These and other features of the invention will be best understood and appreciated from the following description of one type of suitable apparatus for carrying out the process as shown in the accompanying drawings in which FIGS. 1 and 2 are diagrammatic views illustrating the step of forming the preliminary mold, FIG. 3 is a sectional view on an enlarged scale of the final negative mold and a portion of the hirsute product formed thereby, FIG. 3A is a fragmentary view of an elastomeric hirsute sheet produced from the mold of FIG. 3, FIG. 4 is a fragmentary sectional view of the mold employed in producing an elastomeric product having a suede finish on one surface, FIG. 5 is a similar view showing a portion of the material in position on the mold, FIG. 6 is a diagrammatic view in elevation of apparatus for carrying out the process of the invention, and FIG. 7 is a fragmentary view of an elastomeric sheet having a suede finish.

The illustrated apparatus as shown in FIG. 6 is characterized by an endless flexible molding and carrying band 20 having its outer surface specially prepared to present a contour which is the reverse of that desired in the product. For example, the outer surface of the band 20 may contain a multiplicity of tubular passages such as the passages marked 15 in the band 20 of FIG. 3. These passages may be about ¼" in length and open at right angles to the upper or active surface of the band. They may be slightly tapering and number about 400 to the square inch. For imparting a suede finish to the product, the band 20 may have an outer surface such as that suggested in FIGS. 4 and 5, that is to say, it may have a multiplicity of recesses 51 not over .02" in depth and in number 3,000 to the square inch or thereabouts.

A preferred procedure for producing a molding and carrying band 20 of the desired configuration will now be described. This requires, first, the preparation of a primary negative mold. This mold is prepared by forcing sharp needles, or bundles of sharpened steel rods into a thick block or slab of relatively soft medium such as lead, aluminum, clay, wax or wood, but for our purpose we prefer to use a thickened or gelled plastisol which later may be further hardened by heating or fusing. The procedure outlined in FIGS. 1–3 is to be followed when the desired product is to have a hirsute, shaggy or pile surface configuration. The form 10 is filled to the required depth with a relatively soft material, preferably a thickened or gelled plastisol into which is forced a multiplicity of parallel closely spaced needles 12 held or clamped into a block 13 or other holder. For special decorative effects, some of the needles may be longer or shorter than others so that the tubular passages created by the needles are of varying depth. Other decorative variations may be created by omitting needles from certain areas so as to create an embossed design in the products produced from the molding band. The needle-containing block 13, following penetration into the soft molding matrix, is withdrawn leaving the matrix 11 thus provided with a multiplicity of fine closed-end tubular passages opening at right angles into the upper face of what may be termed for convenience the primary negative mold. This mold is next further hardened by the action of heat so as to withstand the subsequent molding operations.

From the standpoint of expense and convenience, the primary negative mold formed in this manner is of relatively small area and to secure the extensive molding area required in the band 20, it is advantageous to produce from the mold of FIG. 2 a positive master mold of the same limited area. This may readily be accomplished by casting intermediate positive master molds from the small negative primary mold and employing for this purpose any sheet material such as compounded polyvinyl chloride, rubber vulcanizates, epoxy resins or other suitable elastomers. The positive master molds or mold sections which faithfully reproduce the original master mold contours, may next be joined together by any convenient means such as fusing, cementing, or bonding to a fibrous ply to form a laminate.

A large positive mold is now prepared from assembled intermediate positive molds and from this the final large negative mold is produced by pouring onto the positive mold surface an elastomeric resinous composition such as urethane, silicone, rubber, or its copolymers or other suitable molding composition which will reproduce the details of the positive mold, conform to it and finally solidify and develop elastomeric character having adequate flexibility as well as heat and oil resistance. Other suitable compounds for the final negative mold may be neoprene or epoxy compositions.

A large negative mold constructed as described may be used for intermittent compression molding or casting of the desired product but preferably, and as herein shown, for continuous molding, in which case the ends are joined to form an endless casting or molding band. This of course may be reinforced by the inclusion of a textile, metallic or fiber glass ply. In FIG. 6, the endless mold and carrying belt 20 is represented as including a series of large mold sections 20' which have been reproduced from the corresponding large positive mold above described. The upper reach of endless band 20 is arranged to run in horizontal path over pulleys 21 and 22 and in the direction from left to right.

The first step in the manufacturing process as herein shown may be that of applying to the surface of the band 20 a decorative film or layer of ink or pigment by means of a stencil printer 23, or other printing or coating means. This decorative layer is so designed as to adhere only weakly or temporarily to the band 20, but to merge later and become a permanent and decorative surface layer of the product itself. This surface pattern may be applied so as to impart a wide variety of decorative effects to the finished molded product. It may consist of a solid wash coating or a discontinuous pattern, and by varying its consistency and thickness its flow may be controlled so that it coats only the outer surface of the mold or so that it penetrates deeply into the mold's tubular cavities. The printer 23 may be followed by a drier operating to harden the printed pattern.

After leaving the printing zone, the band 20 progresses to a spreader 25 which may be a doctor blade, spray or roller coater operating continuously to lay on the pigment-coated band 20 a layer of polyvinyl plastisol, or other compounded elastomer in viscous form from a mass 24 which may be transformed to the solid state by heat polymerization or fusion. The layer as applied will uniformly coat the band 20 and the underlying decorative coating if present and will ordinarily entrap air in the surface depressions and passages of the band. In order to expel the entrapped air, the band together with its viscous or semi-liquid gel layer is next passed through a suction chamber and subjected to partial vacuum for an interval sufficient for the entrapped air to be withdrawn so that the viscous plastisol will enter and fill all the needle-formed passages of the band with hair-like strands of filaments 41.

In cases where the plastisol layer is thin or insufficient to fill all the depressions of the band, and also to provide a sufficient body layer for the product, an additional series of applying and suction and heating stations may be provided, as indicated by reference characters 27, 28 and 29 in FIG. 6. After subjecting the band to partial vacuum, the viscous layer or coating with its appendent strands is advanced with it to a heating zone to cause polymerization, fusion or vulcanization as the case may be. For this purpose, the belt 20 is passed through a heater 30 in which heat is supplied by infra-red lamps, steam pipes, or electrical heating units as described.

The molded and solidified product, if desired, may be reinforced by applying to the back surface of its body layer, which lies uppermost on the band 20, a continuous ply or plies of textile or elastomeric sheet or a layer of sponge or foam elastomer may be applied singly or in combination with the reinforcement. Such additional plies may be pre-coated on one side with a heat-activated adhesive and as herein shown may be taken from a supply reel 31 by a belt conveyor 33, passed through a pre-heater 32 and over a guide pulley 34 by which adherent contact is made with the molded product. The latter has not been stripped from the band at this stage. The backing plies of elastomer may be decoratively embossed or printed in attractive designs.

The reinforced product may then be passed through a cooler which prepares it for the stripping operation to be performed by the stripping rollers 35. These remove the finished product from the band 20, withdraw the strands or filaments from the passages 15 and direct the finished product to a wind-up reel 36. In FIG. 3 is shown a cross-sectional view of the molding and carrying band 20 as produced by successive stages from the primary negative mold 14 of FIG. 2, through the positive master molds, and the large positive molds and the large negative molds above described. The endless mold is provided with the parallel closely-spaced closed-end passages 15 which open from its upper surface.

In FIG. 3A is also shown a small section of the final hirsute product which comprises the sheet portion 40 from which project the integral hairs or needle-like filaments 41 that have been molded in the needle-formed passages 15 of the band 20.

When a sheet product having a suede finish is desired, a similar series of steps is carried out in the preparation of the band 20 except that the preliminary mold 50, as shown in FIG. 4, is provided with minute surface depressions 51. These may be originally formed in the preliminary mold by merely indenting a soft metal plate with an awl, or needle-like tool. A master positive mold of small area is then formed from the indented metal plate, and this is expanded in area through the various stages above described. In FIG. 7 a portion of the suede-finished product is shown as comprising the sheet 52 and the minute projections 53 formed by the cavities in the mold surface.

It will be understood that if desired the band 20 may be constructed and arranged to present a varied pattern. For example, it may have areas containing deep passages like those of FIG. 3, alternating with areas having shallow recesses like those of FIG. 4. The employment of such a varigated band results in the production of an elastomeric sheet having areas of hirsute appearance alternating with or adjacent to areas of suede appearance.

In forming an elastomeric product having a thin body sheet the vacuum step of the process may be so conducted as to draw the material into depressions or cavities 42 in points opposite to some or all of the passages 15 of the band, thus somewhat reducing the amount of material in the finished body sheet.

The material used for the preliminary mold is preferably a vinyl plastisol which is prepared by dispersing finely divided polyvinyl resin powder in a liquid plasticizer therefor to form a creamy liquid. The preparation of the plastisols and their use are well known by those skilled in the art, and are described in detail in an article appearing in Modern Plastics 26, 78 (April 1949) by Perrone and Neuwirth.

Having thus disclosed my invention and described in detail illustrative examples thereof, I claim as new and desire to secure by Letters Patent:

A molded product comprising a continuous body sheet of cured elastomeric polyvinyl plastisol merging at one surface into a multiplicity of integral appendent flexible hair-like solid filaments uniformly and closely spaced and in length substantially exceeding the thickness of the body sheet, the body sheet containing a multiplicity of cavities arranged in its surface opposite to said appendent filaments and which reduce its thickness in spots, each cavity in the body sheet being located in line with a corresponding solid filament.

References Cited by the Examiner

UNITED STATES PATENTS

| | | | |
|---|---|---|---|
| 2,248,811 | 7/1941 | Cotterman | 264—227 |
| 2,516,091 | 7/1950 | Renaud | 18—58 |
| 2,576,977 | 12/1951 | Stober | 18—47.5 |
| 2,585,515 | 2/1952 | Talboys | 161—116 XR |
| 2,619,679 | 12/1952 | Baldanza | 18—47.5 |
| 2,693,638 | 11/1954 | Anderson | 29—552 |
| 2,952,576 | 11/1955 | Wheelock | 154—46 |
| 2,781,097 | 2/1957 | Nold | 29—552 |
| 2,931,748 | 4/1960 | Muller | 154—46 |
| 2,950,504 | 8/1960 | Suzuki | 18—58 |
| 3,026,224 | 3/1962 | Rogers | 161—116 XR |
| 3,050,426 | 8/1962 | Stevens | 161—116 |

JACOB H. STEINBERG, *Primary Examiner.*

ROBERT H. WHITE, EARL M. BERGERT, ALEXANDER WYMAN, *Examiners.*